United States Patent [19]

Khanna

[11] Patent Number: 4,978,734
[45] Date of Patent: Dec. 18, 1990

[54] POLYAMIDE-POLYAMIDE AND POLYBENZOXAZOLE-POLYAMIDE POLYMER

[75] Inventor: Dinesh N. Khanna, West Warwick, R.I.

[73] Assignee: Hoechst Celanese Corp., Somerville, N.J.

[21] Appl. No.: 321,039

[22] Filed: Mar. 9, 1989

[51] Int. Cl.$^5$ .............................................. C08G 73/22
[52] U.S. Cl. ..................... 528/184; 524/599; 524/600; 524/606; 528/125; 528/128; 528/185; 528/188; 528/191; 528/220; 528/229; 528/320; 528/321; 528/353
[58] Field of Search ............... 528/184, 331, 185, 188, 528/191, 321, 320, 353, 125, 128, 220, 229

[56] References Cited

U.S. PATENT DOCUMENTS 3,984,375 10/1976 Frost .................................... 528/331
4,111,906 9/1978 Jones et al. .......................... 528/229

FOREIGN PATENT DOCUMENTS 6270424 3/1987 Japan.
2188936 10/1987 United Kingdom.

Primary Examiner—Harold D. Anderson
Attorney, Agent, or Firm—Perman & Green

[57] ABSTRACT

The present invention provides polyamide-polyamide and polybenzoxazole-polyamide polymers derived therefrom with improved processing and film characteristics having incorporated into the polymeric backbone the polymeric condensation residuum of novel aromatic diamino compounds having the formula:

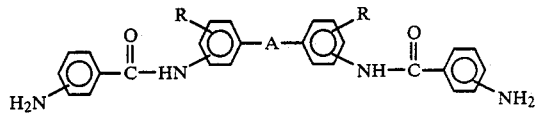

wherein A is selected from the group consisting of $SO_2$, O, S, CO, $C_1$ to $C_6$ alkylene, perfluoroalkylene or perfluoroalkylene having from 1 to 10 carbon atoms and a bond directly linking the two aromatic groups and R is selected from the group consisting of hydrogen, hydroxy and $C_1$ to $C_4$ alkoxy.

The polyamide-polyamide polymers of this invention are prepared by reacting compounds of the above formula, alone or admixed with othr aromatic diamines, with one or more aromatic or aliphatic dicarboxylic acid or amide-forming derivatives thereof. Polybenzoxazole-polyamide drivatives of such polyamide-polyamide polymers are prepared utilizing compounds of the above formula wherein R is hydroxy or $C_1$ to $C_4$ alkoxy, and by subjecting the resulting alkoxy or hydroxy-substituted polyamide-polyamide to a dehydrating and cyclizing reaction to form the oxazole linkage which gives rise to polybenzoxazole-polyamide polymer.

19 Claims, No Drawings

POLYAMIDE-POLYAMIDE AND POLYBENZOXAZOLE-POLYAMIDE POLYMER

BACKGROUND OF THE INVENTION

1. Field of the Invention

This invention relates to new fluorine-containing polyamide-polyamide polymers and polybenzoxazole-polyamide polymers derived therefrom which exhibit improved thermal stability, improved resistance to solvents, good processability, good film-forming properties and good film characteristics.

2. Description of Related Art

Polyamides derived from aromatic diamine and aromatic di-acid monomers are widely used in the aerospace industry and electronics industry because of their toughness, low density, thermal stability, radiation resistance, mechanical strength and good dielectric properties. However, such polyamides are often difficult to process thermally and thin films prepared therefrom are often brittle and lack acceptable optical transparency.

U.S. Pat. No. 3,179,635 discloses the preparation of polyamide-polyimide polymers said to have good thermal stability and good film-forming properties which may be prepared by condensing a tetra functional aromatic dianhydride, and aromatic diamine and an aromatic acid halide. Polyamides and polybenzoxazole derivatives thereof based on the condensation product of aromatic diamines and aromatic dicarboxylic acids and their derivatives are disclosed in U.S. Pat. Nos. 3306876, 3449296 and 4622285. U.K. Patent Application GB-2188936A discloses the preparation of polyamides and polybenzoxazole derivatives thereof based on the condensation product of 2,2-bis(3-amino-4-hydroxyphenyl)-hexafluoropropane with an aromatic dicarboxylic acid or acid halide, followed by cyclization of the polyamide to form a polybenzoxazole. Similar fluorine-containing polyamides are disclosed in U.S. Pat. No. 3328352.

In Applicant's co-pending application Serial Number 915,342, filed in the United States Patent and Trademark Office on October 2, 1986, is disclosed hydroxy or alkoxy substituted polyamide polymers which, in the preferred embodiment, are prepared by forming the polymeric condensation product of hexafluoro-2,2-bis(3-amino-4-hydroxyphenyl) propane and an aromatic di-acid halide. These polymers are particularly useful in the preparation of photoresist compositions and may also be converted to the corresponding polybenzoxazoles by cyclization. Similar polyamides and polybenzoxazole derivatives thereof based, in the preferred embodiment, on the polymer condensation product of 4,4'-bis[2-(3-amino-4-hydroxyphenyl) hexafluoroisopropyl]diphenyl ether and one or more aromatic di-acid halides are disclosed in U.S. Pat. No. 4,845,183, the disclosure of which is incorporated herein by reference.

Whereas the above-referred to polyamide and polybenzoxazole polymers are useful for the utilities disclosed, it is desirable to provide polyamide-polyamide polymers and polybenzoxazole polymers derived therefrom which provide not only superior thermal and thermooxidative stability, but also excellent thermal processability, low moisture uptake, low dielectric constant and good film-forming properties and film characteristics.

SUMMARY OF THE INVENTION

The present invention provides polyamide-polyamide and polybenzoxazole-polyamide polymers derived therefrom with improved processing and film characteristics having incorporated into the polymeric backbone the polymeric condensation residuum of novel aromatic diamino compounds having the formula:

wherein A is selected from the group consisting of $SO_2$, O, S, CO, $C_1$ to $C_6$ alkylene, perfluoroalkylene or perfluoroarylalkylene having from 1 to 10 carbon atoms and a carbon-carbon double bond directly linking the two aromatic groups, and R is selected from the group consisting of hydrogen, hydroxy and $C_1$ to $C_4$ alkoxy.

The polyamide-polyamide polymers of this invention are prepared by reacting compounds of Formula I, alone or admixed with other aromatic diamines, with one or more aromatic or aliphatic dicarboxylic acids or amide-forming derivatives thereof. Polybenzoxazole-polyamide derivatives of such polyamide-polyamide polymers are prepared utilizing compounds of Formula I wherein R is hydroxy or $C_1$ to $C_4$ alkoxy, and by subjecting the resulting alkoxy or hydroxy-substituted polyamide-polyamide to a dehydrating and cyclizing reaction to form the oxazole linkage which gives rise to polybenzoxazole-polyamide polymer.

DETAILED DESCRIPTION OF THE INVENTION

In the more preferred embodiment of the present invention, the R substituent and the amide linkage in Formula I are interchangeably in the meta or para positions with respect to the A group, and the amino substituent groups are meta or para with respect to the amide linkage.

In the most preferred embodiment of the invention, A is a hexafluoroisopropylidene group

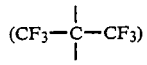

or a 1-phenyl-2,2,2-trifluoroethane group

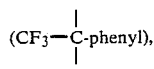

and R is hydroxy. Compounds having the structure of Formula I are disclosed in Applicant's copending application Ser. No. 07/321,140 filed in the United States patent and Trademark Office on even date herewith, the disclosure of which application is incorporated herein by reference.

One embodiment of the polyamide-polyamide (PA-PA) polymers of this invention may be characterized as a polymer comprising at least one recurring group of the structure:

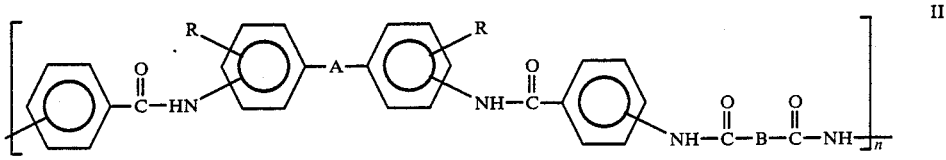

wherein the moiety D is a substituted or unsubstituted alkylene, alicyclic or divalent aromatic radical, the latter being selected from the group consisting of a benzene nucleus, polyphenyl nuclei having up to four phenyl rings, and naphthalene nuclei, n is an integer sufficient to give rise to a polymer having an inherent viscosity of at least about 0.05 dl/g as measured from a solution of the polymer in dimethylacetamide at 25° C. at a polymer concentration of 0.5 weight percent, and A and R are as set forth above in Formula I. Most preferably, n has a value of at least about 0.1 dl/g up to about 1.0 dl/g or more.

Another preferred embodiment of this invention relates to polybenzoxazole-polyamide (PB-PA) polymers comprising at least one recurring group of the structure:

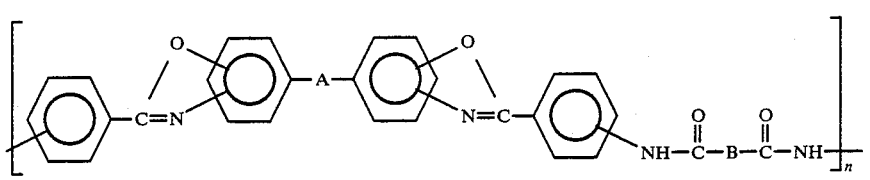

wherein A, B and n are as defined above. These polybenzoxazole polymers are derived from polyamide-polyamide polymers of Formula II, wherein R is hydroxy or $C_1$ to $C_4$ alkoxy positioned interchangeably at the meta or para positions with respect to the A moiety, which are prepared by cyclization of the amide linkage to form the oxazole linkage.

Also within the scope of polymers of Formulas II and III are copolyamide-polyamides and polybenzoxazoles derived therefrom wherein a mixture of the diamine of Formula I and at least one different diamine are copolymerized, such as represented by the formula:

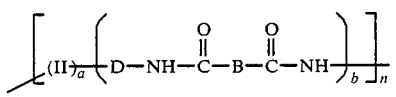

wherein (II) represents a single condensed unit of Formula II, D represents the residuum of a different alkylene, alicyclic or aromatic diamine, the latter which may or may not contain an R substituent as defined above on the aryl nucleus, B and n are as defined above, and (a) and (b) equal the mole fraction of each recurring unit in the polymer chain. Preferred polymers and copolymers of the structure IV are those where the mole fractions of (a) and (b) are:

a=0.01 to 1.0 b=0.0 to 0.99;

more preferably:

a=0.5 to 1.0 b=0.0 to 0.5;

and most preferably:

a=0.7 to 1.0 b=0.0 to 0.3

Polyamide-copolyamides and polybenzoxazoles derived therefrom within the scope of Formulas II and III may also be prepared where the diamine of Formula I is copolymerized with two or more different di-acids or amide-forming derivatives thereof such as represented by the formula:

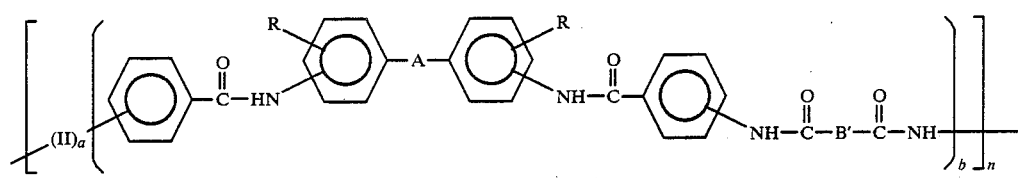

wherein B' represents the residuum of a divalent acid or derivative thereof of the B category but different from the B component present in (II), and (II), A, R, a, b and n are as defined above.

Polybenzoxazoles having a structure analogous to the structures of Formulas IV and V, wherein R is hydroxy or $C_1$ to $C_4$ alkoxy positioned interchangeably at the meta and para positions with respect to the A moiety, may be prepared by cyclizing the amide linkage to form the oxazole linkage as set forth above.

The PA-PA polymers of the invention may be prepared by the condensation polymerization of a diamine of the structure of Formula I above with a dicarboxylic acid, an acid halide of a dicarboxylic acid or the lower alkyl or phenyl esters of a dicarboxylic acid, preferably an aromatic dicarboxylic acid halide. Typical acid halides useful in the practice of the invention may be represented by the following formula:

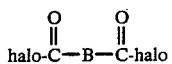

wherein B represents a divalent alkylene, alicyclic or aromatic moiety, preferably an aromatic moiety selected from:

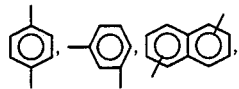

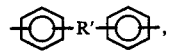

and

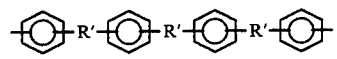

wherein R' is a divalent moiety independently selected from a covalent carbon to carbon bond, methylene, ethylene, propylene, isopropylene, dichloro and difluoroalkylenes up to 3 carbons, hexafluoroisopropylidene, 1-phenyl-2,2,2-trichloroethylidene, oxy, thio, sulfinyl, sulfonyl, sulfonamido, carbonyl, oxydicarbonyl, oxydimethylene, sulfonyldioxy, carbonyldioxy, silanylene, disilanylene, polysilanylene up to 8 Si atoms; siloxanylene, disiloxanylene, and a polysiloxanylene up to 8 Si atoms. Preferably, the linking group R' is selected from oxy, hexafluoroisopropylidene, carbonyl, methylene, a covalent carbon to carbon bond, siloxanylene, disiloxanylene and polysiloxanylenes, most preferably, hexafluoroisopropylidene, 1-phenyl-2,2,2-trifluoroethylidene and oxy.

The hydrogen atoms of the linking group B and/or R' may be substituted by non-interferring monovalent substituents such as chloro, fluoro, lower alkyl up to 6 carbons and phenyl. Also as used herein, the terms "aromatic" and "alicyclic" are meant to include heteroaromatics and heteroalicyclics wherein one or more of ring carbon atoms have been replaced with —O—, —S—, or —N— atoms.

Illustrative acid halides of aromatic dicarboxylic acids useful in the practice of the invention include the acid chlorides of:
isophthalic acid;
phthalic acid;
terephthalic acid;
1,4-phenylenediethanoic acid;
3,3'-biphenyl dicarboxylic acid;
4,4'-biphenyl dicarboxylic acid;
1,1-bis(4-carboxyphenyl)-1-phenyl-2,2,2,-trifluoroethane;
3,3'-dicarboxy diphenyl ether;
4,4'-dicarboxy diphenyl ether;
bis-(4-carboxyphenyl) methane;
bis-(4-carboxyphenyl)-methyl phosphane oxide;
bis-(3-carboxyphenyl)-sulfone;
4,4'-dicarboxytetraphenylsilane;
bis(3-carboxyphenyl)-sulfone;
bis(4-carboxyphenyl)-sulfone;
5-tertiary butyl isophthalic acid;
5-bromoisophthalic acid;
5-fluoro-isophthalic acid;
5-chloroisophthalic acid;
2,2-bis-(3-carboxyphenyl) propane;
2,2-bis-(4-carboxyphenyl) propane;
4,4'-(p-phenylenedioxy) dibenzoic acid;
2,6-naphthalene dicarboxylic acid;
4,4'-para-phenylenedioxy dibenzoic acid;
4,4'-bis[2-(4-carboxyphenyl) hexafluoroisopropyl]-diphenyl ether;
bis(3-carboxyphenyl) sulfide;
bis(4-carboxyphenyl) sulfide;
1,4-phenylene diethanoic acid;
1,4-bis(4-carboxyphenoxy) phenylene;
2,2-bis(4-carboxyphenyl) hexafluoropropane;
2,2-bis(3-carboxyphenyl) hexafluoropropane;
2,2-bis[4-(4-carboxyphenoxy) phenyl]hexafluoropropane;
1,1-bis[4-(4-carboxyphenoxy) phenyl]-1-phenyl-2,2,2-trifluoroethane;
and mixtures thereof.

The moiety B may also be selected from an alkylene moiety having from one to twenty carbons or an alicyclic moiety of four to eighteen carbons. Illustrative compounds of this class of dicarboxylic acid halides include those of the following dicarboxylic acids:
1,4-cyclohexane dicarboxylic acid:
1,3-cyclopentane dicarboxylic acid;
oxalic acid;
1,2-cyclobutane dicarboxylic acid;
1,4-cyclohexane diacetic acid;
malonic acid;
pentanedioic acid;
hexanedioic acid;
2,4-furandicarboxylic acid;
1,10-decanedicarboxylic acid;
1,12-dodecanedicarboxylic acid;
succinic acid;
1,18-octadecanedicarboxylic acid;
glutaric acid;
2,6-cyclohexane dipropionic acid;
adipic acid;
2,6-cyclohexane dihexanoic acid;
and mixtures thereof.

Copolyamide-polyamide copolymers may also be prepared using a mixture of the diamine of Formula I above and at least one other aromatic diamine having the formula:

$$NH_2-D-NH_2$$

wherein D is an aromatic moiety of a phenylene, napthalene or bis-phenylene type compound which may be unsubstituted or ring substituted with halogen, hydroxy, $C_1$ to $C_6$ alkyl or $C_1$ to $C_4$ alkoxy groups.

Illustrative of diamines which are suitable for use in a copolymerization admixture with the diamine of Formula I include:
m-phenylene diamine;
p-phenylene diamine;
1,3-bis(4-aminophenyl) propane;
2,2-bis(4-aminophenyl) propane;
4,4'-diamino-diphenyl methane;
1,2-bis(4-aminophenyl) ethane;
1,1-bis(4-aminophenyl) ethane;

2,2'-diamino-diethyl sulfide;
bis(4-aminophenyl) sulfide;
2,4'-diamino-diphenyl sulfide;
bis(3-aminophenyl)sulfone;
bis(4-aminophenyl) sulfone;
4,4'-diamino-dibenzyl sulfoxide;
bis(4-aminophenyl) ether;
bis(3-aminophenyl) ether;
bis(4-aminophenyl)diethyl silane;
bis(4-aminophenyl) diphenyl silane;
bis(4-aminophenyl) ethyl phosphine oxide;
bis(4-aminophenyl) phenyl phosphine oxide;
bis(4-aminophenyl)-N-phenylamine;
bis(4-aminophenyl)-N-methylamine;
1,2-diamino-naphthalene;
1,4-diamino-naphthalene;
1,5-diamino-naphthalene;
1,6-diamino-naphthalene;
1,7-diamino-naphthalene;
1,8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4'-diamino-biphenyl;
3,3'-dimethyl-4,4'-diamino-biphenyl;
3,4'-dimethyl-4,4'-diamino-biphenyl;
3,3'-dimethoxy-4,4'-diamino-biphenyl;
4,4'-bis(4-aminophenoxy)-biphenyl;
2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
1,3-diamino-adamantane;
bis[2-(3-aminophenyl) hexafluoroisopropyl] diphenyl ether;
3,3'-diamino-1,1,1'-diadamantane;
N-(3-aminophenyl)-4-aminobenzamide;
4-aminophenyl-3-aminobenzoate;
2,2-bis(4-aminophenyl) hexafluoropropane;
2,2-bis(3-aminophenyl) hexafluoropropane;
2-(3-aminophenyl)-2-(4-aminophenyl) hexafluoropropane;
2,2-bis[4-(4-aminophenoxy)phenyl] hexafluoropropane;
2,2-bis[4-(2-chloro-4-aminophenoxy)phenyl hexafluoropropane;
1,1-bis(4-aminophenyl)-1-phenyl-2,2,2-trifluoroethane;
1,1-bis[4-(4-aminophenoxy)phenyl]-1-phenyl-2,2,2-trifluoroethane;
1,4-bis(3-aminophenyl)buta-1-ene-3-yne;
1,3-bis(3-aminophenyl) hexafluoropropane;
1,5-bis(3-aminophenyl) decafluoropentane;
4,4'-bis[2-(4-aminophenoxyphenyl) hexafluoropropyl] diphenyl ether;
and mixtures thereof.

Copolyamide-copolyamide polymers and polybenzoxazole polymers derived therefrom may also be prepared in accordance with this invention wherein both a mixture of the above diamines and a mixture of the above diacids or amide-forming derivatives are reacted.

The polyamide-polyamides of this invention may be prepared by known polymerization techniques, typically by a solution or emulsion condensation method employing a condensation catalyst. Suitable solvents include N-methyl pyrrolidone, gamma-butyrolactone, monochlorobenzene, tetrahydrofuran and mixtures thereof. The reaction is preferably conducted at room temperature using a mixture of one or more of the above solvents with water and in a high speed shearing mixer whereby an emulsion of the polymer is readily formed at low temperatures after all reactants are combined. The polymer may then be recovered as a precipitate after further dilution with water.

The polyamide-polyamide polymers containing hydroxy or $C_1$ to $C_4$ alkoxy substituents on aromatic carbons adjacent to the amido substituent may be readily converted into the corresponding polybenzoxazole-polyamide polymers of this invention by a further dehydrating and cyclization reaction. This reaction is well known and is preferably accomplished by heating the polyamide-polyamide polymer for a sufficient period of time and temperature to cyclize the amido/hydroxy or amido/alkoxy substituent groups to form the oxazole linkage. The preferred method for cyclization is to heat the polyamide-polyamide to a temperature of at least about 300° C. for a period of at least about 1 hour. In general, the polyamide-polyamide polymers of this invention are soluble in common organic solvents, whereas the derivative polybenzoxazole polymers are not. Thus, when shaped articles such as films or composites are prepared, it is preferred to first cast or mold the desired shape, and then heat the casted or molded shape to form the solvent insoluble polybenzoxazole.

The most preferred polyamide-polyamide and polybenzoxazole-polyamide polymers of this invention are prepared by forming the polymeric condensation product of the diamine of Formula I above with one of the following diacid chlorides: isophthaloyl chloride; terephthaloyl chloride; 2,2-hexafluoro-bis(4-chlorocarbonyl phenyl) propane; 4,4'-bis[2-(4-chlorocarbonylphenyl) hexafluoroisopropyl] diphenyl ether; 4,4'-para-diphenyl ether dibenzoyl chloride; 4,4'-para-phenylenedioxy dibenzoyl chloride; 2,6-naphthalene diacid chloride; and mixtures of two or these.

In the preferred embodiment of the present invention, the diamine and diacid or amide-forming derivatives thereof are reacted in approximately equimolar amounts.

The following examples are illustrative in the invention.

EXAMPLE 1

Bis-N,N'-(para-nitrobenzoyl)-hexafluoro-2,2-bis(4-hydroxyphenyl)propane having the following structure is prepared:

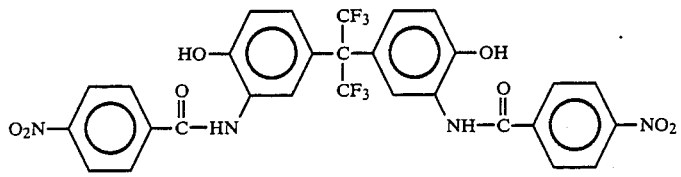

A 500 ml. round bottom flask equipped with a cooling jacket and mechanical stirrer was charged with 30.0 grams (0.082 mole) of 2,2-bis(3-amino-4-hydroxyphenyl) hexafluoropropane and 400 mls. of acetone. The mixture was stirred until the aminophenyl had dissolved, after which 39.6 grams (0.213 mole) of paranitrobenzoyl chloride dissolved in 100 mls. of acetone was added dropwise over a period of 30 minutes. The mixture was maintained at less than 20° C. during the addition, after which the mixture was heated with agitation at 35°–40° C. for a period of two hours. 30.0 grams (0.218 mole) of potassium carbonate was then added gradually and the mixture was agitated for two additional hours at 35°–40° C. The heat was removed and the mixture was agitated for an additional 18 hours at room temperature. Thereafter, 20 mls. of water and 16 mls. of a 50% solution of sodium hydroxide was added with vigorous agitation and the mixture was heated at 50°–55°C. for 30 minutes. The heat was then removed and the mixture was transferred to a beaker and the pH was adjusted in the range of 6.0 to 7.0 by addition of HCL (37%) and 500 ml of additional water, added incrementally over a period of 30 minutes under agitation. The mixture was then filtered on an 11 cm. Buchner filter, and the precipitate was washed with water and dried in an oven at 60°–70° C. The yield of bis-N,N'-(para-nitrobenzoyl)-hexafluoro-2,2-bis(4-hydroxyphenyl) propane was 93.6% of theoretical.

EXAMPLE 2

The product of Example 1 was purified by recrystallization in accordance with the following method.

A 1000 ml. round bottom flask equipped with a mechanical stirrer was charged with 51.0 grams of the crude product of Example 1, 316 grams of acetone and 158 grams of methanol.

The mixture was stirred and heated at 40°–50° C. until the product of Example 1 had dissolved. The mixture was cooled to room temperature and 30 grams of Norite was gradually added after which the mixture was stirred for about 25 minutes. The mixture was then clarified by passing it through a 9 cm. Buchner funnel and using a small amount of a 2 to 1 mixture of acetone/methanol as a rinse. The clarified solution was then transferred to a beaker and heated to 50°–55° C. 300 mls. of warm tap water was added dropwise to the solution over a period of 30 minutes, after which the solution was heated to 60°–65° C. After removal from the heat, the solution was allowed to cool slowly to 20°–25° C. which caused a precipitate of the purified compound to be formed. The mixture was filtered using a 9 cm. Buchner funnel, washed with tap water, and oven dried at 60°–70° C. The yield of product was 44 grams which represents an 86.2% recovery.

EXAMPLE 3

This example illustrates the preparation of bis-N,N'-(para-aminobenzoyl)-hexafluoro-2,2-bis(4-hydroxyphenyl) propane by a reduction of the purified product of Example 2. The product prepared according to this Example has the structure:

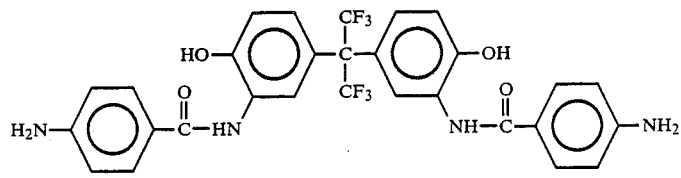

A one liter Parr bottle was charged with 20.0 grams (0.03 mole) of the purified product of Example 2, 1.0 grams of a 5% palladium on carbon catalyst and 180.4 grams of ethyl acetate to form a slurry. The slurry was purged by bubbling nitrogen gas through it for 15 minutes. The bottle was then connected to a shaker apparatus capable of maintaining intimate contact between gas, liquid and solid phases, following which the slurry was purged three times with hydrogen gas to insure a pressure tight seal. The shaker was started and the contents were subjected to 50 psi hydrogen gas while heating at 50°–55° C. The mixture was shaken for about 35 minutes. The mixture was then cooled to 35° C. After purging the resulting slurry with nitrogen, it was filtered to remove the catalyst, after which the solvent was evaporated. The product was heated in an air oven at 90° C. until dry, yielding 17.0 grams of dried product.

Other dinitro and diamino compounds within the scope of the present invention may be prepared by the processes described above or variations thereof which will be evident to those skilled in the art.

The following examples illustrate the preparation of polyamide-polyamide polymers and the polybenzoxazole-polyamide derivatives thereof.

EXAMPLE 4

In a Waring blender at room temperature were placed 37.5 ml of water, 37.5 ml of tetrahydrofuran (THF), 3.02 g (0.005 moles) of the diamine produced in Example 3, 1.06 g of sodium bicarbonate, and 0.1 g of benzyl triethyl ammonium chloride. The contents of the blender wee stirred vigorously and a solution of 2.115 g (0.005 moles) of 2,2-hexafluoro-bis(4-chlorocarbonyl phenyl) propane (6F-diacid chloride) in 25 ml of THF was added over a period of about 2 minutes.

An emulsion formed which was stirred for 5 minutes, after which 300 ml of deionized water was added to precipitate the polymer. The mixture was stirred for an additional 10 minutes, filtered in a Buchner funnel, washed with water and dried overnight in a vacuum oven at 90°–100° C. The yield of the polymer was nearly quantitative.

The resulting polyamide-polyamide polymer had an inherent viscosity of 0.18 dl/g in dimethylacetamide as a 0.5% by weight solution at 25° C., and a glass transition temperature (Tg) of 264° C., and is composed of recurring units of the following chemical structure:

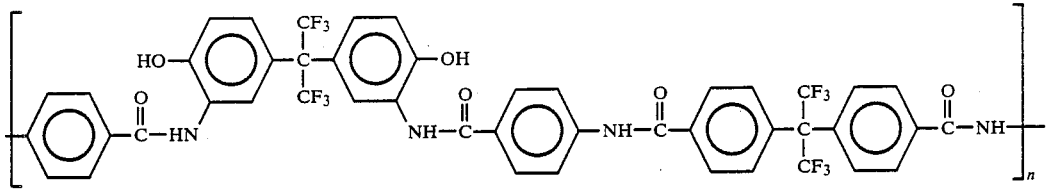

The polyamide-polyamide polymer prepared as above was dissolved in N-methyl-pyrrolidone (NMP) to form a solution which was cast on a glass plate. The coated plate was gradually heated up to about 250° C. to remove the solvent, and then heated at 300° C. for 2 hours to convert the polyamide-polyamide to the polybenzoxazole-polyamide form which is insoluble in most common solvents, including THF and NMP. This polymer has the structure:

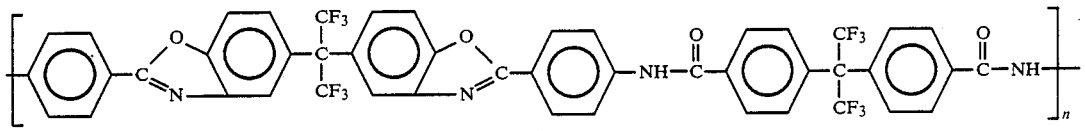

EXAMPLE 5

Example 4 was repeated exactly as set forth above except that the 6F-diacid chloride reactant was eliminated and replaced with 3.135 g (0.005 moles) of 4,4'-bis[2-(4-chlorocarbonylphenyl) hexafluoroisopropyl] diphenyl ether (12F-diacid chloride) having the structure:

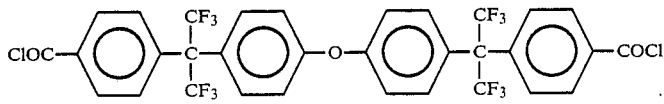

EXAMPLE 6

Example 4 was repeated exactly as set forth above except that the 6F-diacid chloride was eliminated and replaced with 1.015 g (0.005 moles) is isophthaloyl chloride (IPC).

EXAMPLE 7

Example 4 was repeated exactly as set forth above except that the 6F-diacid chloride was eliminated and replaced with 1.475 g (0.005 moles) of 4,4,-para-diphenyl ether dibenzoyl chloride (DEDC).

EXAMPLE 8

Example 4 was repeated exactly as set forth above except that the 6F-diacid chloride was replaced with 1.935 g (0.005 moles) of 4,4'-para-phenylenedioxy dibenzoyl chloride.

The inherent viscosity of each of the polyamide-polyamide polymers produced in Examples 4–8 above is reported in Table 1. Also reported are their glass transition temperatures and thermooxidative stability (the temperature in air at which a 5% weight loss occurs). The specific techniques for determining molecular weight, the glass transition temperature and thermooxidative stability are standard techniques as disclosed in copending application D-1276, the disclosure of which is incorporated herein by reference.

TABLE 1

| Example | Diamine | Diacid | INH. VISC dl/g | Tg(°C.) | Temp at 5% Weight Loss (°C.) |
|---|---|---|---|---|---|
| 4 | Diamine of Ex.3 | 6F-diacid chl. | 0.18 | 264 | 470 |
| 5 | Diamine of Ex.3 | 12F-diacid chl. | 0.20 | 216 | 470 |
| 6 | Diamine of Ex.3 | IPC | 0.18 | 279 | 450 |
| 7 | Diamine of Ex.3 | DEDC | 0.13 | 141 | 400 |
| 8 | Diamine of Ex.3 | PDC | 0.10 | 145 | 310 |

The polymers of this invention exhibit improved thermal flow properties and may be melt spun to form fibers and filaments. Because of the good solubility of the PA-PA polymers in common organic solvents, films may be cast from solvent solutions and optionally may be converted to the polybenzoxazole form. Such films may be used as printed circuit backings, insulating dielectric interlayers and other applications where tough, flexible, high temperature stable films having good dielectric properties have been used in the past.

The polymers of this invention may be molded using standard techniques such as compression molding or injection molding to produce melt fabricated articles such as safety masks, windshields, electronic circuit substrates, airplane windows or the like. They may be compounded with graphite, graphite fiber, molybdenum disulphide or PTFE for the production of self-lubricating wear surfaces useful for piston rings, valve seats, bearings and seals. They may also be compounded with fibers such as glass, graphite or boron fibers to produce molding compounds for high strength structural components such as jet engine components. The polymers may also be compounded with friction materials to produce molding compounds for high temperature braking components or with abrasive materials such as diamonds for high speed grinding wheels.

The PA-PA polymers may be cast as films useful as wire and cable wraps, motor slot liners or flexible printed circuit substrates. They may be used as coatings on substrates such as aluminum or silicone dioxide. They are also useful to produce high temperature coatings for magnetic wire, dip coatings for various electronic components, protective coatings over glass, metal and plastic substrates, were coatings, and photoresist coatings useful in microelectronic processing.

The PA-PA polymers may also be used to produce high temperature adhesives for bonding aerospace structures or electrical circuitry, conductive adhesives when mixed with conductive fillers such as silver or gold for microelectronic applications, or adhesives for glass, metal or plastic substrates.

The polymers may also be used as varnish compositions or matrix resins to produce composites and laminates. The varnish compositions and matrix resins may be used to impregnate glass or quartz cloth, or graphite or boron fibers, for the production of radomes, printed circuit boards, radioactive waste containers, turbine blades, aerospace structural components or other structural components requiring high temperature performance, non-flammability and excellent electrical properties.

In general, the polymers of this invention may be used in all applications as disclosed in copending application Ser. No. 124,634, filed in the U.S. Patent and Trademark Office on November 24, 1987, now U.S. Pat. No. 4,845,183.

It is to be understood that the above-described embodiments of the invention are illustrative only and that modifications throughout may occur to those skilled in the art. Accordingly, this invention is not to be regarded as limited to the embodiments disclosed herein, but is to be limited as defined by the appended claims.

What I claim is:

1. A polyamide-polyamide polymer comprising at least one recurring group of the structure:

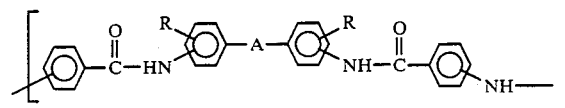

wherein A is selected from the group consisting of $SO_2$, O, S, CO, $C_1$ to $C_6$ alkylene, $CF_3$

$CF_3$ and $CF_3$

phenyl, or A represents a bond directly linking the two aromatic groups, R is selected from the group consisting of hydroxy and $C_1$ to $C_4$ alkoxy, B is a substituted or unsubstituted alkylene, alicyclic or divalent aromatic radical, the latter being selected from the group consisting of a benzene nucleus, polyphenyl nuclei having up to four phenyl rings and naphthalene nuclei, said polymer having an inherent viscosity of at least 0.05 dl/g as measured from a solution of the polymer in dimethylacetamide at 25° C. at a polymer concentration of 0.5 weight percent.

2. The polymer of claim 1 wherein the radical A is

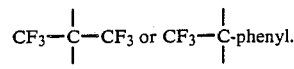

3. The polymer of claim 2 wherein the radical A is

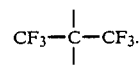

4. The polymer of claim 3 wherein R is para and the amido linkages are meta with respect to the A group.

5. The polymer of claim 4 wherein R is hydroxy.

6. The polymer of claim 4 wherein the imido linkages are para with respect to each amido linkage.

7. The polymer of claim 1 wherein the radical B is

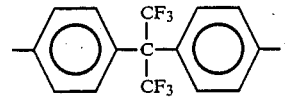

8. The polymer of claim 7 wherein B is the residuum nucleus diacid halide having the formula:

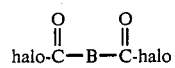

9. The polymer of claim 8 wherein R is hydroxy, A is

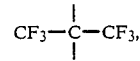

and R is para and the amido linkages are meta with respect to the A group.

10. The polymer of claim 10 wherein the imido linkages are para with respect to each amido linkage.

11. A dried film comprising the polymer of claim 1.

12. A solvent solution of the polymer of claim 1.

13. A polybenzoxazole-polyamide polymer comprising at least one recurring group of the structure:

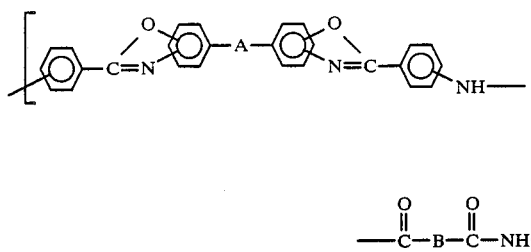

said polymer prepared by cyclizing the polymer of claim 1.

14. The polymer of claim 13 wherein the radical A is

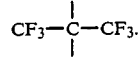

15. The polymer of claim 14 wherein the amido linkages are meta with respect to the A group.

16. The polymer of claim 14 wherein the imido linkages are para with respect to each amido linkage.

17. The polymer of claim 14 wherein the radical B is

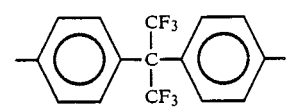

18. The polymer of claim 14 wherein B is the residuum nucleus of a diacid halide having the formula:

$$\text{halo-}\overset{O}{\underset{\|}{C}}-B-\overset{O}{\underset{\|}{C}}\text{-halo}$$

19. A dried film comprising the polymer of claim 13.

* * * * *